(12) United States Patent
Asmanis et al.

(10) Patent No.: US 8,183,711 B2
(45) Date of Patent: May 22, 2012

(54) POWER EXTRACTION FROM SIGNAL SINKS (75) Inventors: Georgios Asmanis, Lake Forest, CA (US); Faouzi Chaahoub, San Jose, CA (US)

(73) Assignee: Quellan, Inc., Santa Clara, CA (US)

( * ) Notice: Subject to any disclaimer, the term of this patent is extended or adjusted under 35 U.S.C. 154(b) by 84 days.

(21) Appl. No.: 12/476,934

(22) Filed: Jun. 2, 2009

(65) Prior Publication Data

US 2010/0301671 A1 Dec. 2, 2010

(51) Int. Cl.
H02J 3/14 (2006.01)

(52) U.S. Cl. ............ 307/31; 307/77; 307/82; 307/149; 307/151; 327/257; 323/273; 323/274; 323/275; 323/276; 323/277; 323/278; 323/279; 323/280; 323/281; 323/282; 323/284; 323/266; 323/267; 320/162

(58) Field of Classification Search .................. None
See application file for complete search history.

(56) References Cited

U.S. PATENT DOCUMENTS

| | | | | |
|---|---|---|---|---|
| 5,297,099 A * | 3/1994 | Bolan et al. | ...... | 365/229 |
| 5,345,592 A * | 9/1994 | Woodmas | ...... | 725/130 |
| 5,870,046 A | 2/1999 | Scott et al. | | |
| 6,363,066 B1 * | 3/2002 | Frimodig | ...... | 370/360 |
| 6,385,435 B1 | 5/2002 | Lee | | |
| 6,490,174 B1 * | 12/2002 | Kompelien | ...... | 363/16 |
| 6,647,518 B1 | 11/2003 | Asmanis | | |
| 6,996,344 B1 * | 2/2006 | Caidar et al. | ...... | 398/141 |
| 7,035,361 B2 | 4/2006 | Kim et al. | | |
| 7,050,388 B2 | 5/2006 | Kim et al. | | |
| 7,202,642 B1 * | 4/2007 | Chen et al. | ...... | 323/222 |
| 7,307,569 B2 | 12/2007 | Vrazel et al. | | |
| 7,333,316 B1 * | 2/2008 | Norris | ...... | 361/111 |
| 7,352,824 B2 | 4/2008 | Vrazel et al. | | |
| 7,366,244 B2 | 4/2008 | Gebara et al. | | |
| 7,522,883 B2 | 4/2009 | Gebara et al. | | |
| 2002/0109585 A1 * | 8/2002 | Sanderson | ...... | 340/310.01 |
| 2004/0190661 A1 | 9/2004 | Vrazel | | |
| 2005/0093731 A1 | 5/2005 | Skov et al. | | |
| 2006/0158165 A1 * | 7/2006 | Inn et al. | ...... | 323/280 |
| 2007/0029882 A1 * | 2/2007 | Watanabe | ...... | 307/112 |
| 2007/0060059 A1 | 3/2007 | Kim et al. | | |
| 2008/0106313 A1 | 5/2008 | Keady et al. | | |
| 2008/0106314 A1 | 5/2008 | Keady et al. | | |
| 2008/0111526 A1 * | 5/2008 | Shuey | ...... | 323/274 |

* cited by examiner

Primary Examiner — Rexford N Barnie
Assistant Examiner — Justen Fauth
(74) Attorney, Agent, or Firm — King & Spalding (57) ABSTRACT A power extractor suitable for locations proximate to the sink of a signal channel is disclosed. The power extractor can generate power from the signal channel without substantially disturbing a quality of signals within the channel. In one embodiment, the power extraction circuit can include: a current source coupled to a sink side of a signal channel, where the signal channel is independent of any power supply signal, the current source being high impedance to maintain signal quality within the signal channel; a first regulator configured to generate a first regulated supply from a current derived from the signal channel using the current source; and a second regulator coupled to the first regulator, where the second regulator is configured to generate a second regulated supply from the first regulated supply.

20 Claims, 8 Drawing Sheets

POWER EXTRACTION FROM SIGNAL SINKS

FIELD OF THE INVENTION

The invention relates in general to power supplies associated with electronic devices, and more specifically to extraction of power from signal sinks.

BACKGROUND

Signal propagation between computing or electronic devices typically involves cables (e.g., co-axial, twisted-pair, etc.). In order to increase a length of such cabling, the signals running through the cabling may need to be enhanced or reconstructed at a termination sink. This reconstruction can be performed using specialized chips that are located proximate to the sink. However, many signaling protocols do not include a power supply in the signal channel running through the cable.

SUMMARY

A power extractor suitable for locations proximate to the sink of a signal channel is disclosed. The power extractor can generate power from the signal channel without substantially disturbing a quality of signals within the channel. In one embodiment, the power extraction circuit can include: a current source coupled to a sink side of a signal channel, where the signal channel is independent of any power supply signal, the current source being high impedance to maintain signal quality within the signal channel; a first regulator configured to generate a first regulated supply from a current derived from the signal channel using the current source; and a second regulator coupled to the first regulator, where the second regulator is configured to generate a second regulated supply from the first regulated supply.

In one embodiment, a method of extracting power can include: receiving a signal from a sink side of a signal channel, where the signal channel is independent of any power supply signal; detecting a voltage drop on the signal using a high impedance current source; generating a first regulated supply from a first regulator circuit using a current derived from the signal channel via the current source; and generating a second regulated supply from the first regulated supply using a second regulator.

In one embodiment, a cable connection module can include: a connector channel coupled to a sink, where the connector channel includes a signal channel that is independent of any power supply signal; and a power extractor circuit coupled to the connector channel proximate to the sink, the power extractor circuit being configured to extract power from the signal channel, where the power extractor circuit includes: a high impedance current source coupled to the signal channel, where signal quality is maintained within the signal channel; a linear drop regulator configured to generate a first regulated supply from a current derived from the signal channel using the current source; and a switching regulator coupled to the linear drop regulator, where the switching regulator is configured to generate a second regulated supply from the first regulated supply.

DETAILED DESCRIPTION

Particular embodiments allow power to be generated from a signal channel without substantially disturbing a quality of signals within that channel. A power extractor in particular embodiments is suitable for implementations in locations proximate (e.g., in a cable connector) to a sink side of a signal channel. Other locations for a power extractor in particular embodiments include any suitable location along a cable connection (e.g., source, sink, intermediate tap point, etc.). Further, any suitable voltage levels, or number of regulated power supplies, can be accommodated in particular embodiments. Various regulator designs can be utilized to effectively target particular chips or devices receiving the regulated power output(s). As described herein, the various regulators and associated circuitry may have different arrangements to adapt to the particular constraints of different applications.

Figure 1:
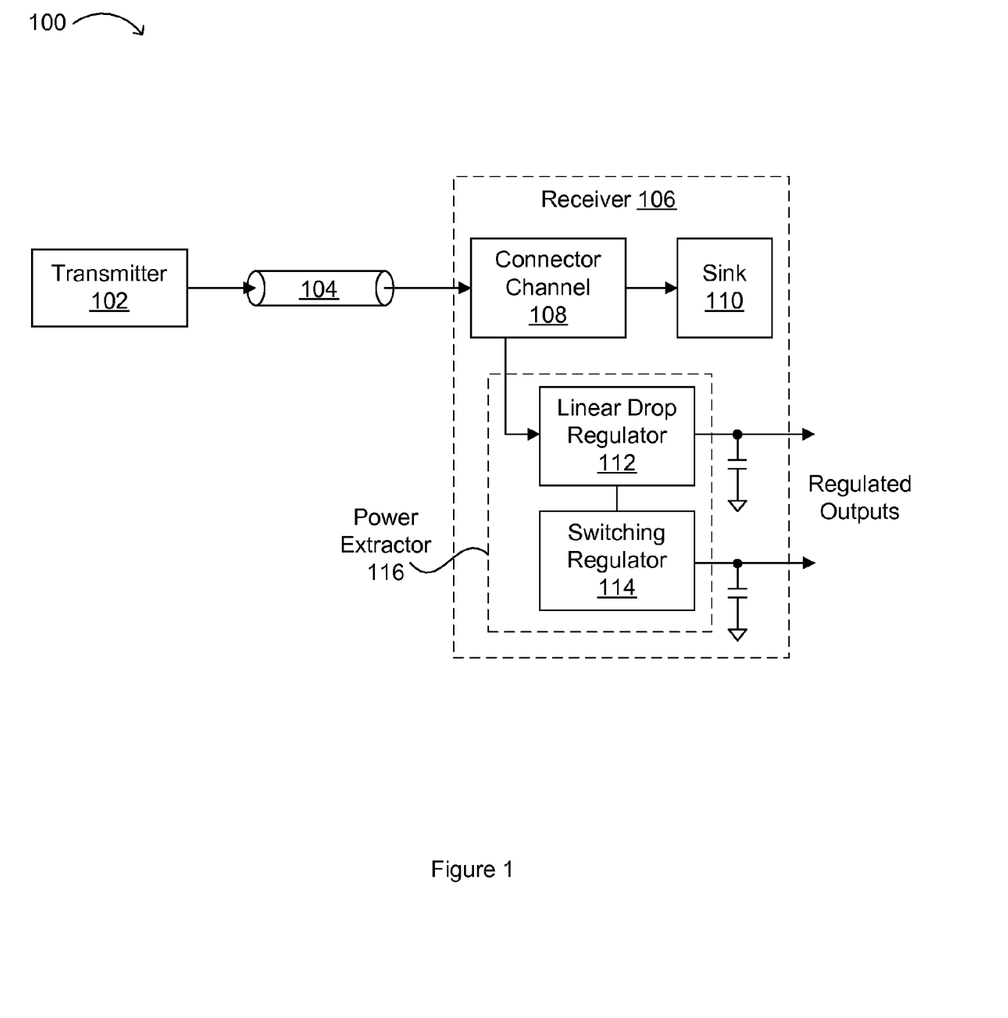
FIG. 1 is a block diagram showing an example power extractor arrangement.

Referring now to FIG. 1, shown is a block diagram of an example power extractor arrangement 100. Transmitter 102 can transmit signals via cable 104. For example, cable 104 can be any suitable type of connection, such as a co-axial cable, a twisted-pair, or any type of bus (e.g., a serial peripheral interface (SPI), a universal serial bus (USB), inter-integrated circuit bus ($I^2C$), any DC-coupled open drain interfaces, as well as double (sink and source) terminated DC-coupled interfaces, etc.) to provide a connection. Further, a signal channel within cable 104 can include any suitable type of signaling (e.g., differential pair, current signaling, voltage signaling, etc.), that supports a protocol without a power supply or line in the signal channel itself.

Receiver 106 can include a connector channel 108 and sink 110. Connector channel 108 can connect to power extractor 116. Power extractor 116 can provide a first regulated output from linear drop regulator 112, and a second regulated output from switching regulator 114. One or more components shown in receiver 106 can be implemented within cable 104, or at or near a connection module or connector associated with a termination of cable 104. For example, one of more such components can be proximate (e.g., in a printed circuit board (PCB) trace, or a chip within connector channel 108) to a sink side (e.g., a television) in a high-definition multimedia interface (HDMI) application. In another example, an HDMI lane extender can include one or more of such the components when the signal channel is the HDMI cable.

Of course, many variations of the particular example shown in FIG. 1 may be found in certain embodiments. For example, multiple or different types of regulators, regulated outputs, other types of cables, ordering and locations of components, as well as different connection points for the power extraction circuitry can be selected. Other types of circuitry for amplification or other functions can also be included.

Particular examples described herein involve extraction of direct current (DC) power from a far side receiver of a 50Ω VDD or VCC terminated sink (e.g., as in an HDMI receiver).

Particular embodiments can also support power extraction from signals having any suitable impedance, such as impedances ranging from about 1Ω to about 100Ω, and including from about 25Ω to about 75Ω. Particular embodiments can also support voltage regulation outputs having any suitable voltage, such as voltages ranging from about 0.7 V to about 20 V, including from about 1 V to about 5 V, such as about 1.2 V and about 2.5 V. Thus, power extractors of particular embodiments can be used in a variety of different products with different impedances and regulation voltages.

Figure 2:
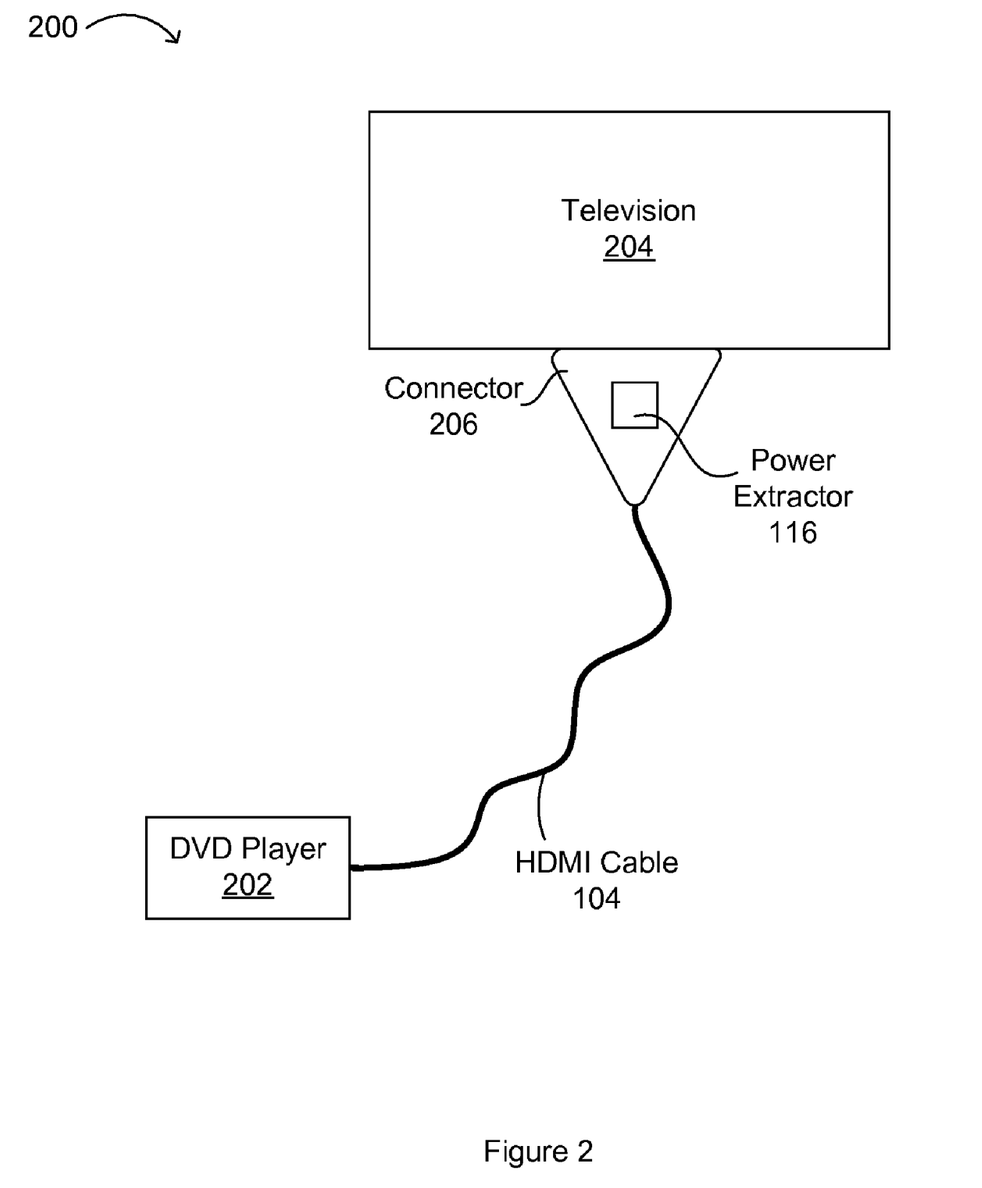
FIG. 2 is a diagram showing an example power extractor application.

Referring now to FIG. 2, shown is a diagram of an example power extractor application 200. In this example, a digital video disc (DVD) player 202 is the HDMI transmitter or source. Cable 104 may thus be an HDMI cable, having connector or connection module 206 at a sink termination side, which can connect to television 204. Power extractor 116 can be integrated within connector 206, or otherwise located proximate to the sink side of cable 104. In this fashion, longer cables 104 (e.g., about 3 m, 10 m, 30 m, etc., and depending on the cable gauge) can be accommodated because degraded signals within cable 104 can be reconstructed using circuitry powered from power extractor 116. Further, signal operational quality in cable 104 may not be substantially affected by power extractor 116, thus maintaining performance of a DVD played from player 202 on television 204.

Thus, an amount of power extracted from the signals in cable 104 is limited so that the signal operation and/or quality may not be substantially affected. In addition, for signal protocols that operate in a bidirectional fashion, such power extractors 116 can be employed at either end of cable 104. In general, any signaling protocol where there is no separate power signal or supply within cable 104 can be supported in particular embodiments. Also, other chips and/or circuitry, besides signal reconstruction or amplification, can also be powered via the extracted power.

Figure 3:
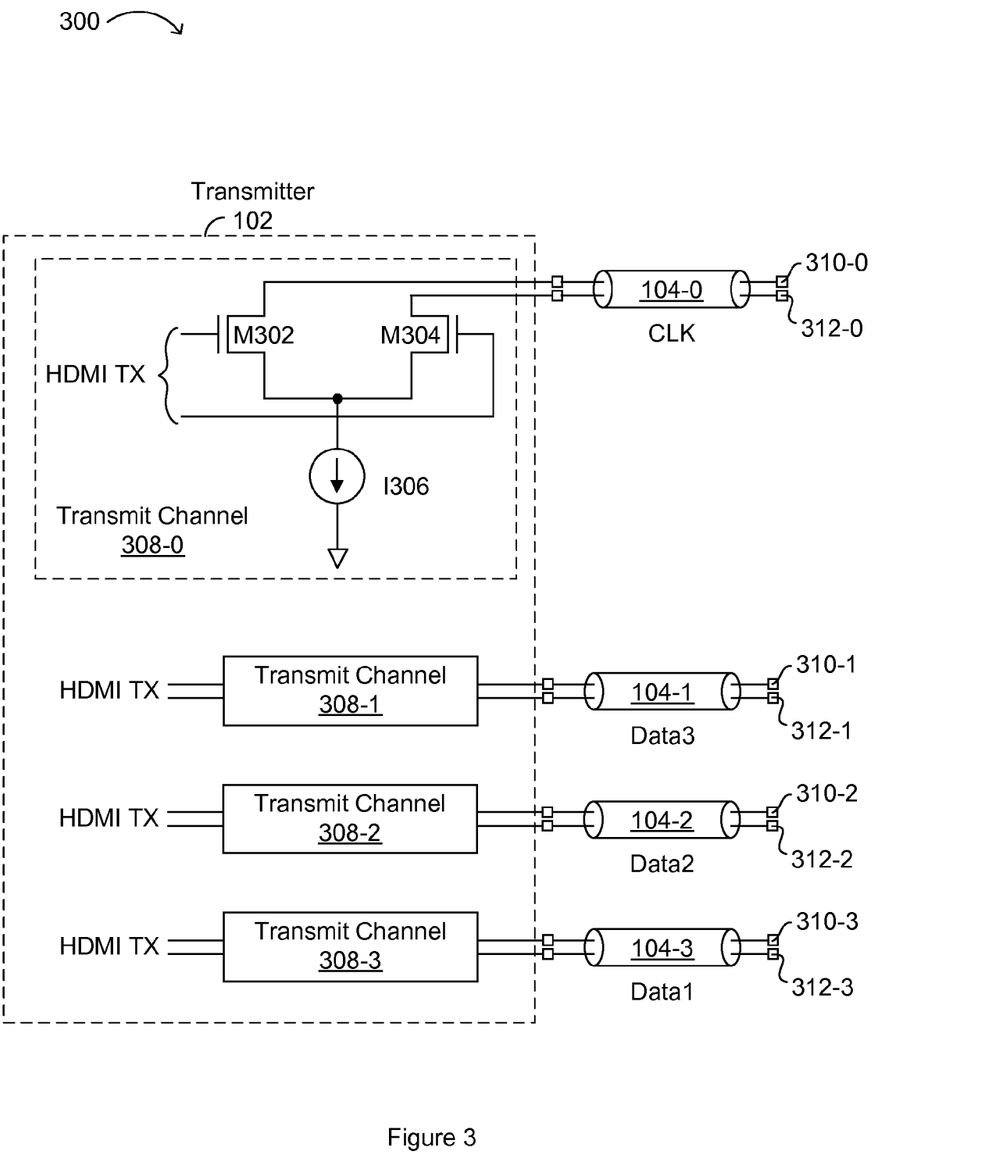
FIG. 3 is a block schematic diagram showing an example transmitter structure.
Figure 4:
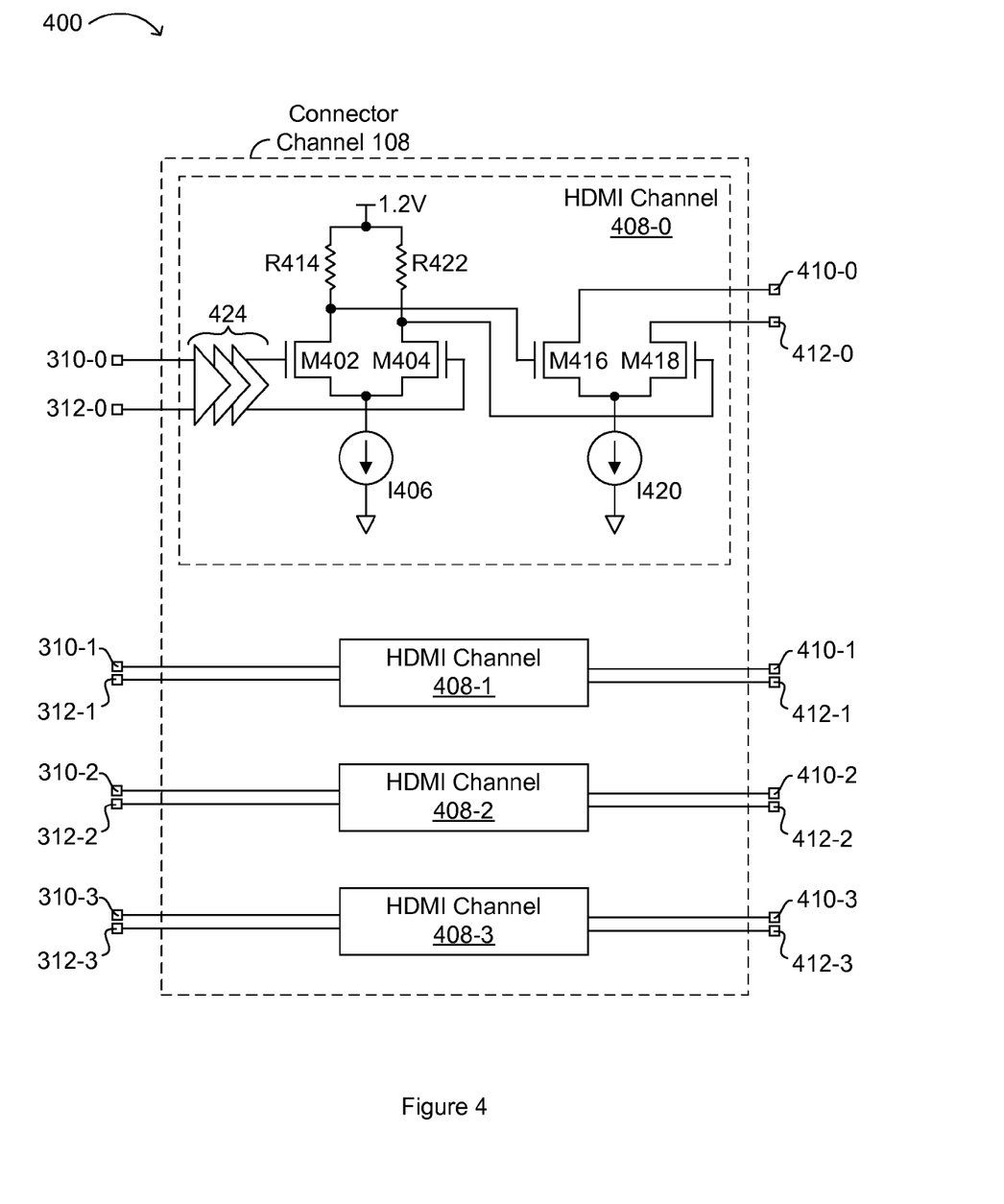
FIG. 4 is a block schematic diagram showing an example connector channel structure.
Figure 5:
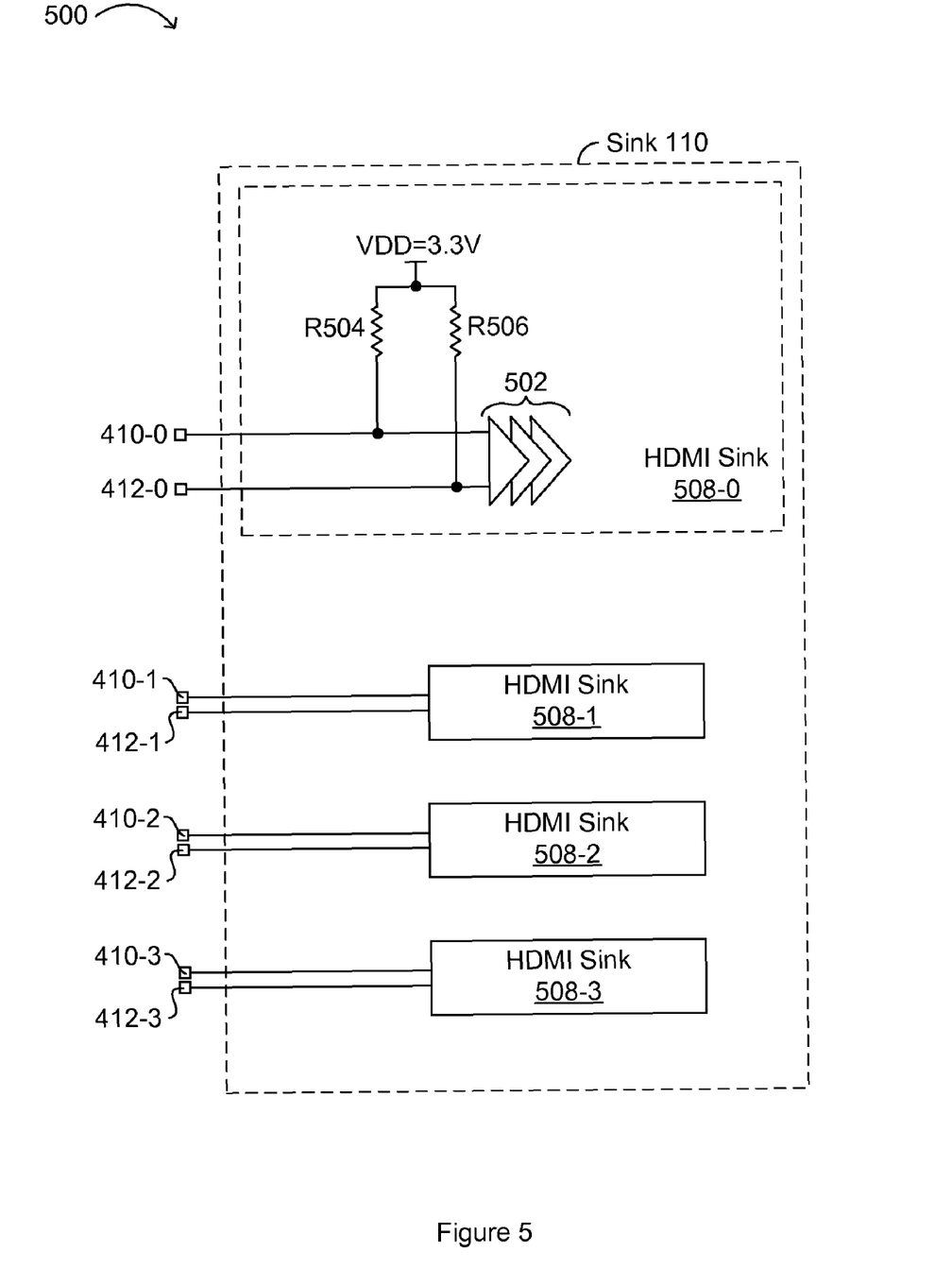
FIG. 5 is a block schematic diagram showing an example sink structure.

The example circuitry discussed below with reference to FIGS. 3-5 shows HDMI related circuitry. Thus, differential signal pairs, three of which provide data signals, and one of which provides clock signaling, are illustrated. However, other protocols, types, and numbers of signals in a channel, can also be supported in particular embodiments.

Referring now to FIG. 3, shown is a block schematic diagram of an example transmitter structure 300. In this example, transmitter 102 includes transmit channels 308-0, 308-1, 308-2, and 308-3. Each transmit channel 308 can include NMOS transistors M302 and M304 coupled to current source I306 as indicated, to provide differential signaling. Transmit channel 308-0 can connect via signal channel 104-0 to differential pair terminals 310-0 and 312-0, for clock signal transmission. For data signal transmission, transmit channel 308-1 can connect via signal channel 104-1 (Data3) to differential pair terminals 310-1 and 312-1, transmit channel 308-2 can connect via signal channel 104-2 (Data2) to differential pair terminals 310-2 and 312-2, and transmit channel 308-3 can connect via signal channel 104-3 (Data1) to differential pair terminals 310-3 and 312-3.

Referring now to FIG. 4, shown is a block schematic diagram of an example connector channel structure 400. In this example, conductor channel 108 includes HDMI channels 408-0, 408-1, 408-2, and 408-3. Each conductor channel 408 can include buffers 424 for buffering an incoming differential pair (e.g., 310-0 and 312-0) for connection to a differential amplifier formed by NMOS transistors M402 and M404, resistors R414 and R422, and current source I406. Outputs from the differential amplifier can connect to NMOS transistors M416 and M418 that are coupled to current source I420 for controlling corresponding terminals (e.g., 410-0 and 412-0). Similarly, HDMI channel 408-1 receives signals 310-1/312-1, and provides signals 410-1/412-1, HDMI channel 408-2 receives signals 310-2/312-2, and provides signals 410-2/412-2, and HDMI channel 408-3 receives signals 310-3/312-3, and provides signals 410-3/412-3.

Referring now to FIG. 5, shown is a block schematic diagram of an example sink structure 500. Sink 110 can include sinks 508 for each differential signal pair to be terminated. For example, HDMI sink 508-0 can receive signal pair 410-0/412-0, HDMI sink 508-1 can receive signal pair 410-1/412-1, HDMI sink 508-2 can receive signal pair 410-2/412-2, and HDMI sink 508-3 can receive signal pair 410-3/412-3. Each sink 508 can include buffers 502, as well as pull-up resistors R504 and R506.

Figure 6:
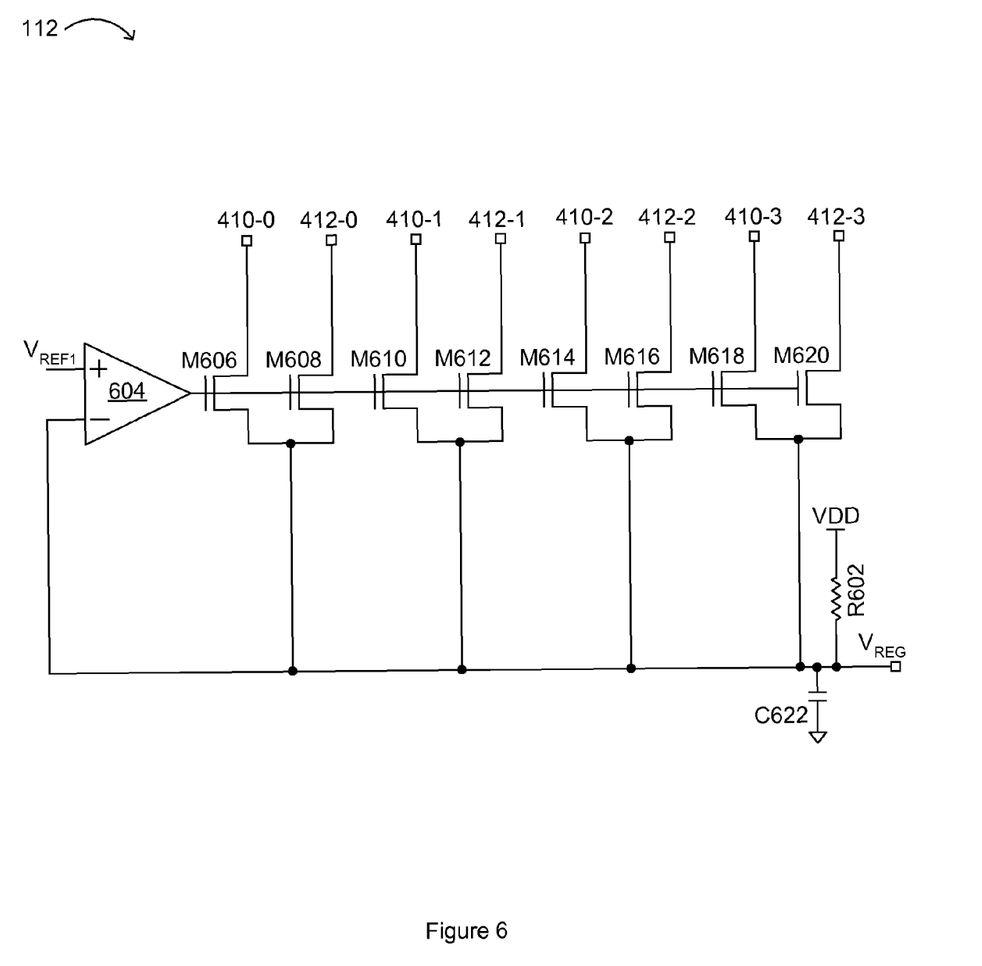
FIG. 6 is a block schematic diagram showing an example linear drop regulator circuit.

Referring now to FIG. 6, shown is a block schematic diagram of an example linear drop regulator circuit 112. A high impedance current source (e.g., NMOS transistors M606, M608, M610, M612, M614, M616, M618, and M620, controlled by an output from operational amplifier 604) can connect to corresponding inputs (e.g., 410-0, 412-0, 410-1, 412-1, 410-2, 412-2, 410-3, and 412-3) of a signal sink via a signal channel (e.g., PCB trace, HDMI cable, etc). The NMOS transistors are controlled based on a comparison of the regulated output voltage ($V_{REG}$) against a reference voltage ($V_{REF1}$). In this particular example, both $V_{REG}$ and $V_{REF1}$ can be about 2.5 V, but any suitable regulation voltage can be accommodated in particular embodiments.

In this fashion, linear drop regulator 112 can extract a predetermined DC current from a signal channel (e.g., via connections 410/412), and deliver that current to a load (e.g., at capacitor C622) to provide a regulated voltage ($V_{REG}$). Further, additional current (e.g., about 5 mA) can be extracted from a VDD supply (e.g., about 5 V supplied from an HDMI transmitter) by connecting resistor R602 between the VDD supply and $V_{REG}$. Also, by controlling the gates of the NMOS transistors via operational amplifier 604, a high impedance (e.g., greater than about 1000Ω) is seen at connections 410/412, thereby effectively maintaining signal quality within the signal channel when power is extracted for regulated supply $V_{REG}$.

Figure 7:
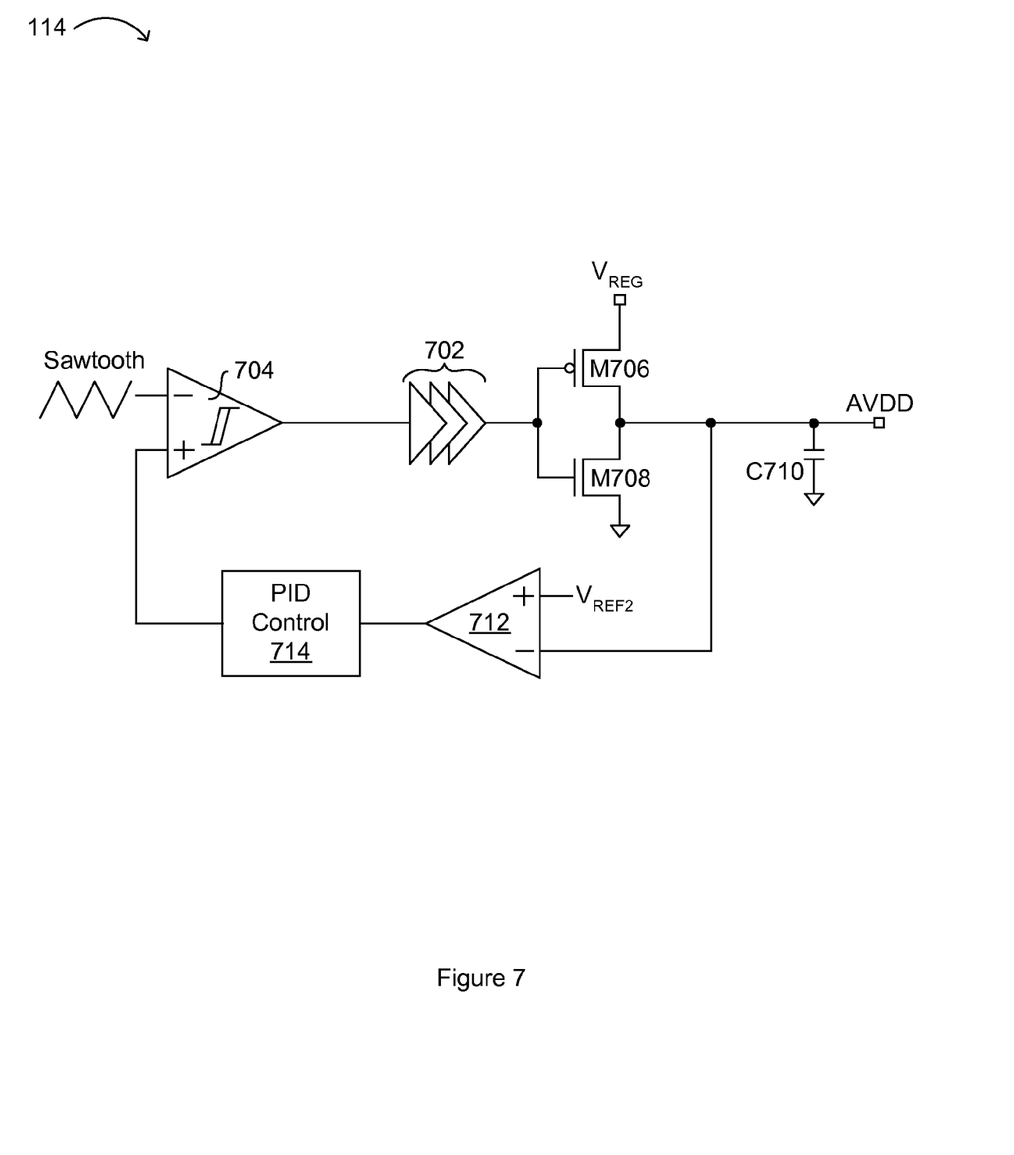
FIG. 7 is a block schematic diagram showing an example switching regulator circuit.

Referring now to FIG. 7, shown is a block schematic diagram of an example switching regulator circuit 114. A second regulated supply (AVDD) may be generated from $V_{REG}$ using switching regulator 114. This example switching regulator can include a comparator 704 with hysteresis, which provides an output to buffer circuitry 702. First regulated supply $V_{REG}$ can provide power to an inverter formed by PMOS transistor M706 and NMOS transistor M708, which can then drive regulated voltage AVDD at capacitor C710.

A feedback loop can include operational amplifier 712 for comparing regulated output AVDD against reference level $V_{REF2}$ (e.g., about 1.2 V). An output from operational amplifier 712 can be provided to proportional-integral-derivative (PID) control 714. Comparator 704 can receive an output from PID control 714 for comparison against a sawtooth waveform. Buffer circuitry/driver 702 may use a special non-overlapping edge clock to maximize power efficiency.

The current available to AVDD (e.g., about 1.2 V) can effectively be doubled relative to that of $V_{REG}$ by the example switching regulator circuit 114. For example, the circuitry described herein can be used to deliver about 60 mV to the generated AVDD supply for each drop on the common mode of the HDMI far side sink inputs (e.g., 410/412) of about 200 mV. Further, the differential signaling path in the signal channel is essentially unaffected due to the high impedance current source structure of linear drop regulator 112. Also, the additional current (e.g., about 5 mA) from the VDD supply (e.g., about 5 V) can be effectively doubled via the combination of the linear drop and switching regulators.

Figure 8:
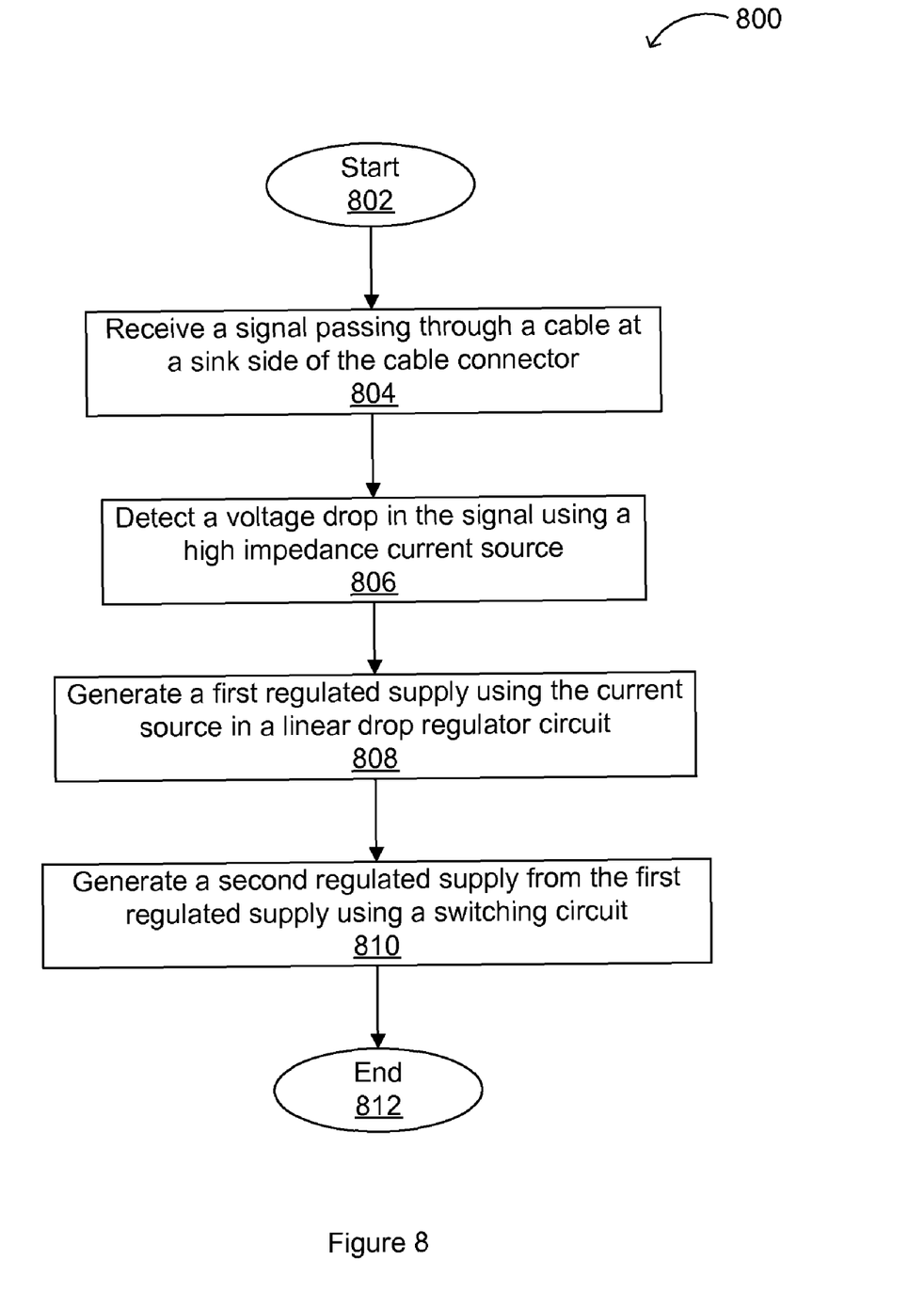
FIG. 8 is a flow diagram showing an example method of extracting power from a signal channel.

Referring now to FIG. 8, shown is a flow diagram of an example method 800 of extracting power from a signal channel. The flow can begin (802), and a signal passing through a cable can be received at a sink side of the cable connector (804). A voltage drop in the signal can be detected using a high impedance current source (806), such as via NMOS transistors. A first regulated supply (e.g., $V_{REG}$) can be generated using the current source in a linear drop regulator circuit (808). A second regulated supply (e.g., AVDD) can also be generated from the first regulated supply using a switching circuit (810), completing the flow (812).

Power extractors as described herein can generate power from a signal channel without substantially disturbing an operational quality of signals within the channel. These power extractors are particularly suitable for implementation near sink sides of cables, where the signal channels are independent of any power signals. In addition, any suitable technology (e.g., CMOS, Bi-CMOS, etc.) and feature sizes (e.g., 0.18 µm, 0.15 µm, with 0.13 µm, etc.) can be used to implement circuits and functions as described herein.

Although particular embodiments of the invention have been described, variations of such embodiments are possible and are within the scope of the invention. For example, although particular regulator arrangements and structures have been described and shown, other regulators and the like can also be accommodated in accordance with various aspects. For example, while a linear drop regulator and a switching regulator are shown, either regulator alone and/or other types of regulators and extraction circuitry, etc., can also be used in particular embodiments. Also, applications other than power extraction from cable signaling or the like can also be accommodated in accordance with particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A power extraction circuit, comprising:
a current source coupled to a sink side of a channel of a differential signal that derives a current from the channel of the differential signal, the current source being a high impedance current source that maintains signal quality within the signal channel;
a first regulator configured to generate a first regulated supply from the current derived from the signal channel using the current source; and
a second regulator coupled to the first regulator and configured to generate a second regulated supply from the first regulated supply.

2. The power extraction circuit of claim 1, wherein the channel comprises at least one differential signal pair.

3. The power extraction circuit of claim 1, wherein the channel comprises a plurality of differential signal pairs.

4. The power extraction circuit of claim 1, wherein the channel comprises a high-definition multimedia interface (HDMI) cable.

5. The power extraction circuit of claim 1, wherein the first regulator comprises a linear drop regulator.

6. The power extraction circuit of claim 5, wherein the linear drop regulator comprises:
an operational amplifier configured to compare the first regulated supply to a reference voltage and provide an input control signal to an arrangement of transistors based on the comparison.

7. The power extraction circuit of claim 1, wherein the second regulator comprises a switching regulator.

8. The power extraction circuit of claim 7, wherein the switching regulator comprises an inverter powered by the first regulated supply, the inverter being configured to receive an amplified control signal and provide the second regulated supply.

9. The power extraction circuit of claim 1, wherein the first regulated supply comprises a voltage of about 2.5 V.

10. The power extraction circuit of claim 1, wherein the second regulated supply comprises a voltage of about 1.2 V.

11. The power extraction circuit of claim 1, being implemented in a connector of a cable.

12. The power extraction circuit of claim 1, wherein the channel comprises a printed circuit board (PCB) trace.

13. A method of extracting power, the method comprising:
receiving a signal from a sink side of a channel of a differential signal;

deriving a current from the channel of the differential signal by a high impedance current source;

detecting a voltage change of the differential signal by a buffer;

generating a first regulated supply from a first regulator circuit using the current derived from the signal channel via the high impedance current source; and generating a second regulated supply from the first regulated supply using a second regulator.

14. The method of claim 13, wherein the receiving the signal comprises receiving a plurality of differential signals.

15. The method of claim 13, further comprising powering a circuit configured to amplify the differential signal using at least one of the first and the second regulated supplies.

16. The method of claim 13, wherein the generating the second regulated supply comprises doubling an available current as compared to the first regulated supply.

17. A cable connection module, comprising:

a connector channel coupled to a sink, the connector channel including a channel of a differential signal; and a power extractor circuit coupled to the connector channel proximate to the sink and configured to extract power from the connector channel, wherein the power extractor circuit comprises a high impedance current source coupled to the channel of the differential signal that derives a current from the channel of the differential signal and maintains signal quality within the channel of the differential signal;

a linear drop regulator configured to generate a first regulated supply from the current derived from the signal channel using the high impedance current source; and a switching regulator coupled to the linear drop regulator and configured to generate a second regulated supply from the first regulated supply.

18. The cable connection module of claim 17, wherein the channel comprises a high-definition multimedia interface (HDMI) cable.

19. The cable connection module of claim 17, wherein the first regulated supply comprises a voltage of about 2.5 V.

20. The cable connection module of claim 17, wherein the second regulated supply comprises a voltage of about 1.2 V.

\* \* \* \* \*